United States Patent [19]

Fernandez

[11] 4,171,630
[45] Oct. 23, 1979

[54] COVER LOCKING SYSTEM

[76] Inventor: Jose L. A. Fernandez, 4015 SW. 7th St., Miami, Fla. 33134

[21] Appl. No.: 870,512

[22] Filed: Jan. 18, 1978

[51] Int. Cl.² .................... B65D 55/14; E05B 65/12
[52] U.S. Cl. ............................................ 70/164; 70/255
[58] Field of Search ............... 70/162, 163, 164, 166, 70/167, 168, 169, 170, 171, 172, 173, 255, 256; 220/86 R, 210

[56] References Cited
U.S. PATENT DOCUMENTS

| 1,788,473 | 1/1931 | Smith | 70/170 |
| 1,857,054 | 5/1932 | Mylar | 70/256 |
| 1,907,365 | 5/1933 | Prosser | 70/170 |
| 2,041,387 | 5/1936 | Adams | 70/170 |

Primary Examiner—Robert L. Wolfe
Attorney, Agent, or Firm—Ostrolenk, Faber, Gerb & Soffen

[57] ABSTRACT

A locking system for a cover for a hollow pipe includes a spring-biased latch and a latch defeating means operable by the cover to maintain the bolt of the latch disengaged from the cover after the latch is opened.

4 Claims, 3 Drawing Figures

COVER LOCKING SYSTEM

This invention relates to locking devices and more specifically relates to a device to provide safety locking of any kind of cap or cover. Locking the gasoline tank cap of motor vehicles is a particularly desirable use.

This invention will be described with reference to the drawings in which.

Figure 1:
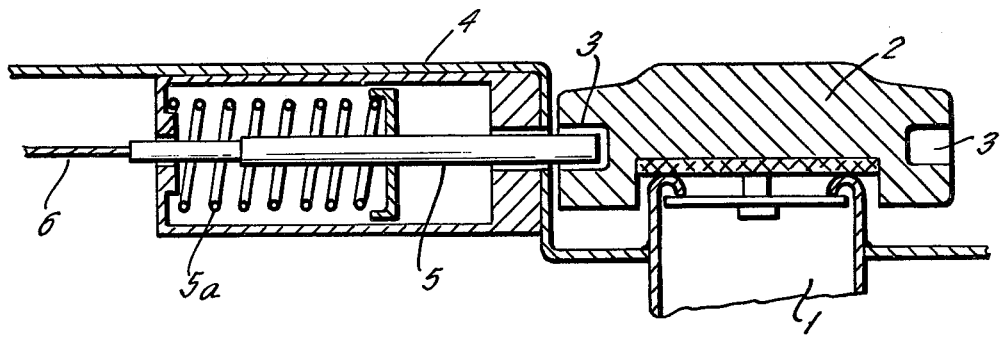
FIG. 1 is a side view of a locked cap.
Figure 2:
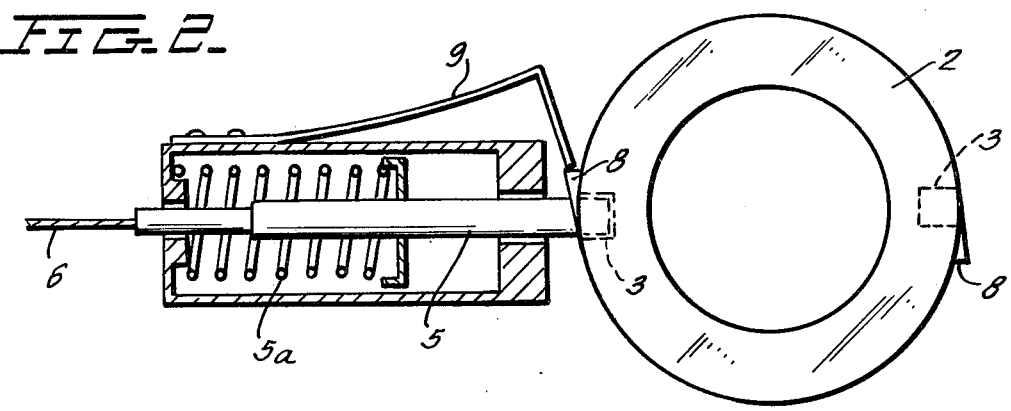
FIG. 2 is a top view of the locked cap.
Figure 3:
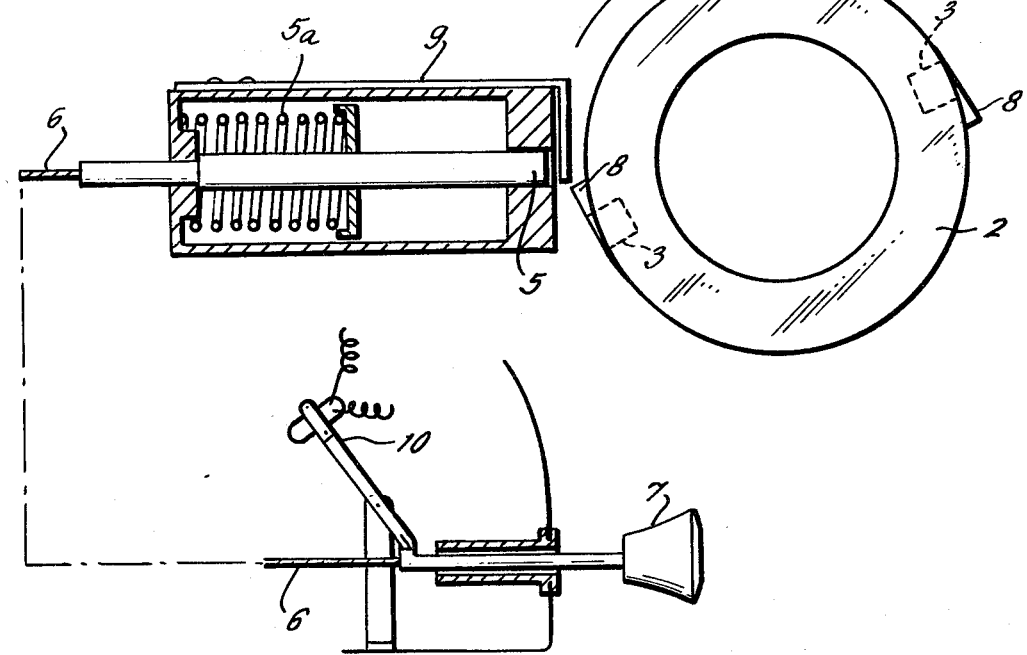
FIG. 3 is a top view of an unlocked cap and a plunger which can be operated from inside a vehicle to operate the latch.

A hollow pipe 1 leading from the gasoline tank of an automobile has its open end covered with the usual gas cap 2. Cap 2 is rotatable and is a generally circular disc rotatable about its axis and coaxial with the pipe 1. Cap 2 has one or more slots 3 in its lateral face. Mounted to the inside of the automobile frame 4 is a latch mechanism. The latch includes a slidable bolt 5 which can move into and out of slot 3 and a biasing spring 5a which biases bolt 5 to the right in FIG. 1. The embodiments shown in the drawings have a spring actuated bolt 5 but any other type of biasing means which urges bolt 5 into slot 3 can be used.

Bolt 5 is connected at one end to a cable 6 which, in turn, is attached to a button or key 7 mounted on or near the dashboard of the automobile. When the control key 7 is pulled, cable 6 withdraws bolt 5 from slot 3.

A wedge 8 is located on the lateral surface of cap 2 near each slot 3. A spring 9 or other type of biasing means is provided to impinge against wedge 8 and impart rotational movement to cap 2 when bolt 5 is moved out of slot 3 out of alignment.

To unlock cap 2, control key 7 is pulled which causes cable 6 to withdraw bolt 5 from slot 3. Spring 9 impinges on wedge 8 causing cap 2 to rotate so that bolt 5 and slot 3 are out of alignment. In this position, spring 9 blocks the return movement of bolt 5 against cap 2 by spring 5a. Control key 7 can also be connected to the electrical circuit of the automobile, such as to relay 10 so that the motor vehicle can not be started if the cap has been unlocked.

To lock cap 2 and to reinstate the ignition key's electrical circuit, cap 2 is rotated so that wedge 8 displaces spring 9 from its blocking position in front of bolt 5. If desired, a suitable locking system can be provided to hold key 7 in its withdrawn position until key 7 is rotated and depressed. It will also be recognized that the manner in which the ignition system's electric circuit is controlled can be mechanical or electromechanical.

Various changes and modifications can be made in the present invention without departing from the spirit and scope thereof. The various embodiments disclosed herein were for the purpose of further illustrating the invention but were not intended to limit it.

I claim:

1. A locking system for a cover comprising a hollow pipe having an open end, a rotatable cover comprising a generally circular disc rotatable about its axis and coaxial with said pipe and connected to said open end of said pipe, at least one slot in a lateral surface of said cover, a bolt movable into and out of said slot, biasing means urging said bolt into said slot, means to overcome said biasing means and withdraw said bolt from said slot, and defeating means operable by said cover to prevent movement of said bolt into said slot after said bolt is withdrawn from said slot wherein said defeating means comprises second biasing means to rotate said rotatable cover such that said bolt and slot are out of alignment and to move between said bolt and said slot after said bolt is withdrawn from said slot.

2. The locking means of claim 1 wherein said second biasing means imparts an axial force to a wedge-shaped projection on a lateral surface of said cover.

3. The locking means of claim 2 wherein said wedge-shaped projection is disposed adjacent said slot.

4. The locking means of claim 3 wherein said cover is the cover to the gasoline tank pipe and further comprising means to defeat the electrical ignition system of said automobile when said bolt is withdrawn from said slot connected to said means to overcome said biasing means.

* * * * *